United States Patent
Fleming et al.

(10) Patent No.: US 7,113,681 B2
(45) Date of Patent: Sep. 26, 2006

(54) POLYMER OPTICAL WAVEGUIDE

(75) Inventors: Simon Fleming, Lane Cove West (AU);
Ian Bassett, Wollstonecraft (AU);
Mark Sceats, Pyrmont (AU); **Martijn
Van Eijkelenborg**, Chippendale (AU)

(73) Assignee: The University of Sydney, Sydney (AU)

( * ) Notice: Subject to any disclaimer, the term of this patent is extended or adjusted under 35 U.S.C. 154(b) by 16 days.

(21) Appl. No.: 10/362,573

(22) PCT Filed: Jun. 20, 2001

(86) PCT No.: PCT/AU01/00891

§ 371 (c)(1),
(2), (4) Date: Jun. 11, 2003

(87) PCT Pub. No.: WO02/16984

PCT Pub. Date: Feb. 28, 2002

(65) Prior Publication Data

US 2004/0101262 A1    May 27, 2004

(30) Foreign Application Priority Data

Aug. 25, 2000   (AU)   .................................... PQ9688

(51) Int. Cl.
*G02B 6/02*   (2006.01)

(52) U.S. Cl. .................... 385/125; 385/123; 385/124; 385/127

(58) Field of Classification Search ................ 385/123, 385/124, 125, 127

See application file for complete search history.

(56) References Cited

U.S. PATENT DOCUMENTS

| | | | |
|---|---|---|---|
| 4,372,648 A * | 2/1983 | Black | 385/127 |
| 5,155,792 A | 10/1992 | Vali et al. | |
| 5,471,553 A | 11/1995 | Teshima | |
| 5,802,236 A * | 9/1998 | DiGiovanni et al. | 385/127 |
| 6,334,017 B1 * | 12/2001 | West | 385/123 |

FOREIGN PATENT DOCUMENTS

| | | |
|---|---|---|
| WO | WO 00/49435 A | 8/2000 |
| WO | WO 2000/49436 | 8/2000 |
| WO | WO 00/60388 A | 10/2000 |
| WO | WO 2001/42829 | 8/2001 |

OTHER PUBLICATIONS

Patent Abstracts of Japan, JP 2000-3035521 A, Nippon Telegraph & Ttelepyhone Corp., (Feb. 2, 2000).
Patent Abstracts of Japan, JP 08-054520 A, Sumitomo Electric Ind. Ltd, (Feb. 27, 1996).

* cited by examiner

*Primary Examiner*—Jennifer Doan
(74) *Attorney, Agent, or Firm*—Foley & Lardner LLP

(57) ABSTRACT

An optical waveguide in the form of an optical fibre (10) having at least one longitudinally extending light guiding core region (11) composed at least in part of a polymeric material, a longitudinally extending core-surrounding region (12) composed of a polymeric material, and a plurality of light confining elements (15), such as, for example, channel-like holes, located within the core surrounding region. The light confining elements extend in the longitudinal direction of the core region and are distributed about the core region, and at least a majority of the light confining elements having a refractive index less than that of the polymeric material from which the core-surrounding region is composed. A preform for use in manufacture of the optical waveguide is also disclosed.

29 Claims, 5 Drawing Sheets

POLYMER OPTICAL WAVEGUIDE

This application is a National filing pursuant to 35 U.S.C. 371 based upon International Application No. PCT/AU01/00891, filed Jun. 20, 2001.

FIELD OF THE INVENTION

This invention relates to optical waveguides in the form of polymer optical fibres.

BACKGROUND OF THE INVENTION

Polymer optical fibres are recognised as having potential application as low cost, broad bandwidth, easy-to-install waveguides. These features make them eminently suitable for use as relatively short length high speed data transmission lines, typically in local area network and residential signal transmission applications. Also, polymer optical fibres may be employed in the transmission of light at wavelength in the red and near infrared, this permitting the use of relatively cheap light sources.

Despite all of these potentially beneficial features, polymer optical fibres have not been produced at a significant commercial level. This is predominantly because of the need for large transverse optical intensity profiles ("spot sizes") and the consequential constraints imposed by existing fabrication techniques. Large spot size fibres are required in order to permit relatively simple couplings and connections, particularly in the context of the intended applications of polymer optical fibres.

A polymer optical fibre having a traditional step index may be drawn with a large spot size, this providing for inexpensive installation of the fibre. However, such a fibre exhibits very large intermodal dispersion.

Single mode polymer optical fibre is difficult to produce and, in any case, the very small mode-size limits application of the fibre.

The technology required to produce graded-index polymer optical fibres is very complex and the inherent cost of producing the fibres at a commercial level is prohibitive.

Viable large spot size, single mode polymer optical fibres have been found to be almost impossible to produce using known fabrication techniques.

SUMMARY OF THE INVENTION

Broadly defined, the present invention provides an optical waveguide in the form of a fibre having:

(a) at least one longitudinally extending light guiding core region composed at least in part of a polymeric material,
(b) a longitudinally extending core-surrounding region composed of a polymeric material, and
(c) a plurality of light confining elements located within the core-surrounding region.

The light confining elements extend in the longitudinal direction of the core region and are distributed about the core region, and at least a majority of the light confining elements have a refractive index less than that of the polymeric material from which the core-surrounding region is composed.

The invention also provides a preform for use in the manufacture of the above-defined optical waveguide, the preform having (a) at least one longitudinally extending core region that is composed at least in part of a polymeric material,
(b) a longitudinally extending core-surrounding region composed of a polymeric material, and
(c) a plurality of elements located within the core-surrounding region, the elements extending in the longitudinal direction of the core region and being distributed about the core region, and at least a majority of the light confining elements having a refractive index less than that of the polymeric material from which the core-surrounding region is composed.

PREFERRED FEATURES OF THE INVENTION

The core-surrounding region preferably is composed of a polymeric material that is the same as that from which the core region is (at least in part) composed and the invention is hereinafter described in this context. However, it will be understood that, when manufacturing procedures permit, the core and core-surrounding regions may be composed of different polymeric materials or differently doped polymeric materials that exhibit the same or different refractive indexes.

By using the same polymeric material for the formation of both the core and the core-surrounding regions, the formation of the fibre (either by extrusion or by drawing from the preform) is simplified relative to previously proposed approaches, and the fibre may conveniently be drawn or extruded with required optical properties. Also, by locating the light confining elements within the core-surrounding region, as an alternative to forming the traditional core-and-cladding or graded structures, the previously mentioned constraints of fabricating a polymer fibre are lessened.

By providing the light confining elements of lower refractive index in the core-surrounding region, that region will exhibit an average refractive index throughout its volume that is less than that of the core region and so function to confine light predominantly to the core region.

The optical waveguide preferably has a single longitudinally extending light guiding core region, and the invention is hereinafter described in this context. However, it will be appreciated that multi-core structures may be formed with the plural cores sharing a common core-surrounding region.

The light confining elements preferably comprise longitudinally extending channel-like holes which, depending upon specific requirements, may be evacuated, be occupied by air or be filled with other (liquid or gaseous) fluids. However, some or all of the light confining elements may comprise filaments of solid material such as glass or a polymeric material that has a refractive index less than that of the core and core-surrounding regions.

The light confining elements when in the form of channel-like holes may have any cross-sectional shape. They may be circular in cross-section, although some or all of the holes may have elliptical cross-sections or arcuate cross-sections. As a further alternative, some or all of the holes may have polygonal cross-sections.

The light confining elements may be quasi randomly distributed but preferably are distributed about the core region in a spatially uniform or symmetrical manner. For example, they may be distributed around a common circle that is concentric with the axis of the core region or be distributed around a plurality of circles which are all concentric with the axis of the core region. As a further alternative, the light confining elements as seen in cross-section may be distributed geometrically in regular arrays, for example, in polygonal honeycomb-like arrays.

The light confining elements may be distributed about the core region in circularly concentric or polygonally concentric arrays, and the cross-sectional area bounded by each of the elements may be arranged to increase with radial distance from the axis of the core region.

Alternatively, the light confining elements may be distributed about the core region in a periodic lattice-like structure. The light confining elements are preferably arranged to occupy preferably at least 30% of the volume of the core-surrounding region and, most preferably, 30 to 80%. In this case a photonic bandgap. formed in the core-surrounding region will, when in use, confine the light to the core region.

When the light confining elements are distributed as a periodic lattice-like structure, the core region may incorporate a hollow core or otherwise be formed with a refractive index lower than that of the surrounding polymeric material. However, the core region preferably is composed wholly of the polymeric material.

The waveguide in the form of optical fibre, as above defined, may be formed with an outer protective sleeve or sheath that is composed of a polymeric material. Such material may be different from that of the core and core-surrounding regions.

The invention will be more fully understood from the following description of alternative forms of optical fibres that embody the invention and preferred methods of forming the optical fibres. The description is provided with reference to the accompanying drawings.

BRIEF DESCRIPTION OF THE DRAWINGS

In the drawings FIGS. 1, 2, 3, 4, 5, 6 and 7 diagrammatic representations of the transverse cross-section of optical fibres that incorporate different embodiments of the invention.

DETAILED DESCRIPTION OF THE INVENTION

Figure 1:
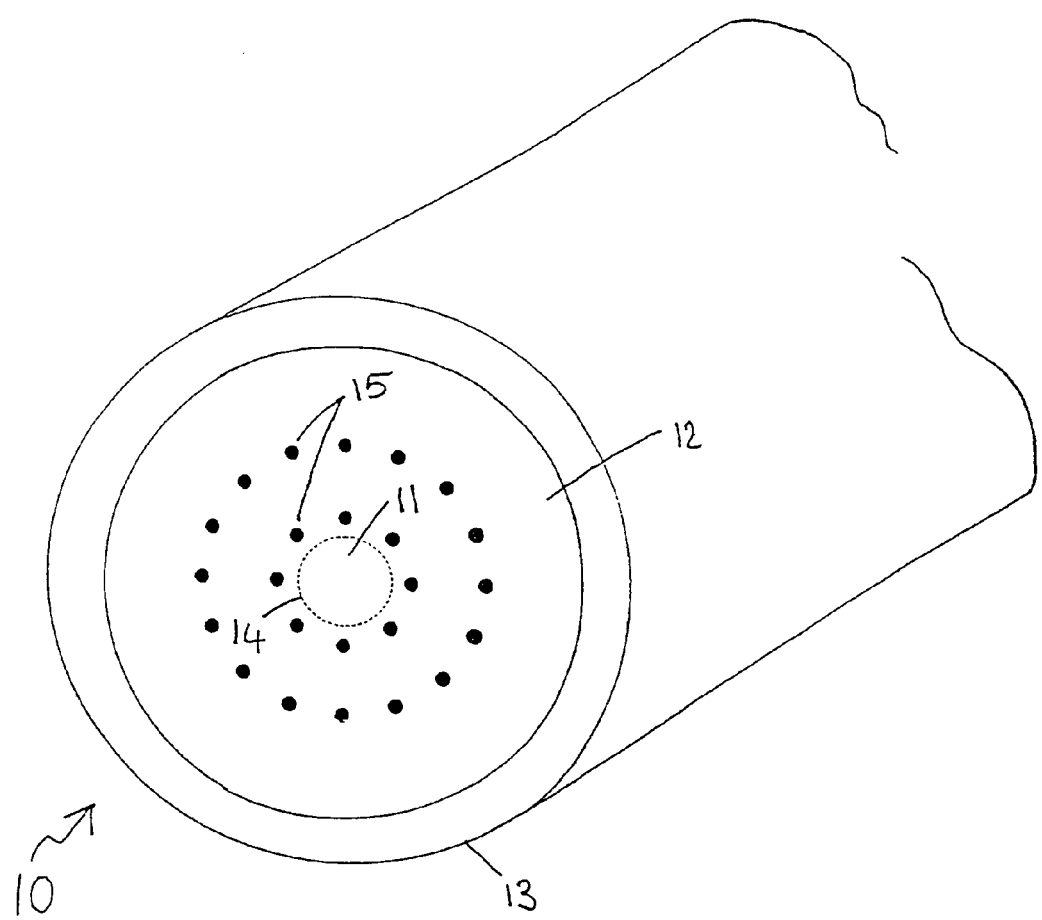

As illustrated in FIG. 1, the optical fibre 10 comprises a longitudinally extending light guiding core region 11, a longitudinally extending core-surrounding region 12, and an outer protective sleeve or sheath 13. The core region 11 is indicated as being defined by the broken circle 14 for convenience of reference, but it will be understood that the core region 11 will not in fact have any clearly defined outer margin.

Although not clearly defined, the core region 11 or, perhaps more accurately, the spot size of guided light might have a diameter within the range 1 μm to 500 μm (more typically 10 μm to 200 μm), and the core-surrounding region 12 might then have a diameter within the range 10 μm to 5000 μm (more typically 100 μm to 2000 μm). The sleeve 13 might typically have a wall thickness in the order of 10 to 1000 μm.

In the preferred form of the invention the core region 11 and the core-surrounding region 12 are homogeneous in the sense that they are both formed from the same polymeric material without any interface between the two regions. Any optically transparent polymeric material may be employed in forming the core and core-surrounding regions, including for example polymethylmethacrylate or a fluoropolymer.

A plurality of light confining elements 15 in the form of longitudinally extending channel-like holes is located within the core-surrounding region 12, and each of the light confining elements 15 extends for the full length of the optical fibre. The light confining elements are distributed about (i.e., surround) the core region 11 and, as illustrated, are positioned uniformly around two common circles that are concentric with the axis of the core region. However, it is to be understood that, depending upon the requirements of the fibre and the spot-shape required of guided light, the light confining elements 15 need not be positioned in a circularly symmetric or other symmetric manner. It will be understood that the light confining elements function collectively to confine the light to the core region.

The light confining elements 15 as formed will normally be occupied by air. However, they may be evacuated, be filled with another fluid or be constituted by filaments of a solid material such as silica, doped silica or a polymeric material, depending upon the optical properties required of the optical fibre.

Whatever their form, a majority of the light guiding elements 15 must exhibit a refractive index that is lower than that of the material from which the core and core-surrounding regions 11 and 12 are formed, so that the core-surrounding region as a whole will exhibit an average refractive index throughout its volume that is less than that of the core region 11.

Each of the light guiding elements 15, when in the form of a channel-like hole, will normally have a diameter within the range of 0.1 μm to 10 μm, and adjacent elements 15 will normally have a centre spacing in the order of 2 μm to 20 μm, depending upon the size of each hole.

Figure 2:
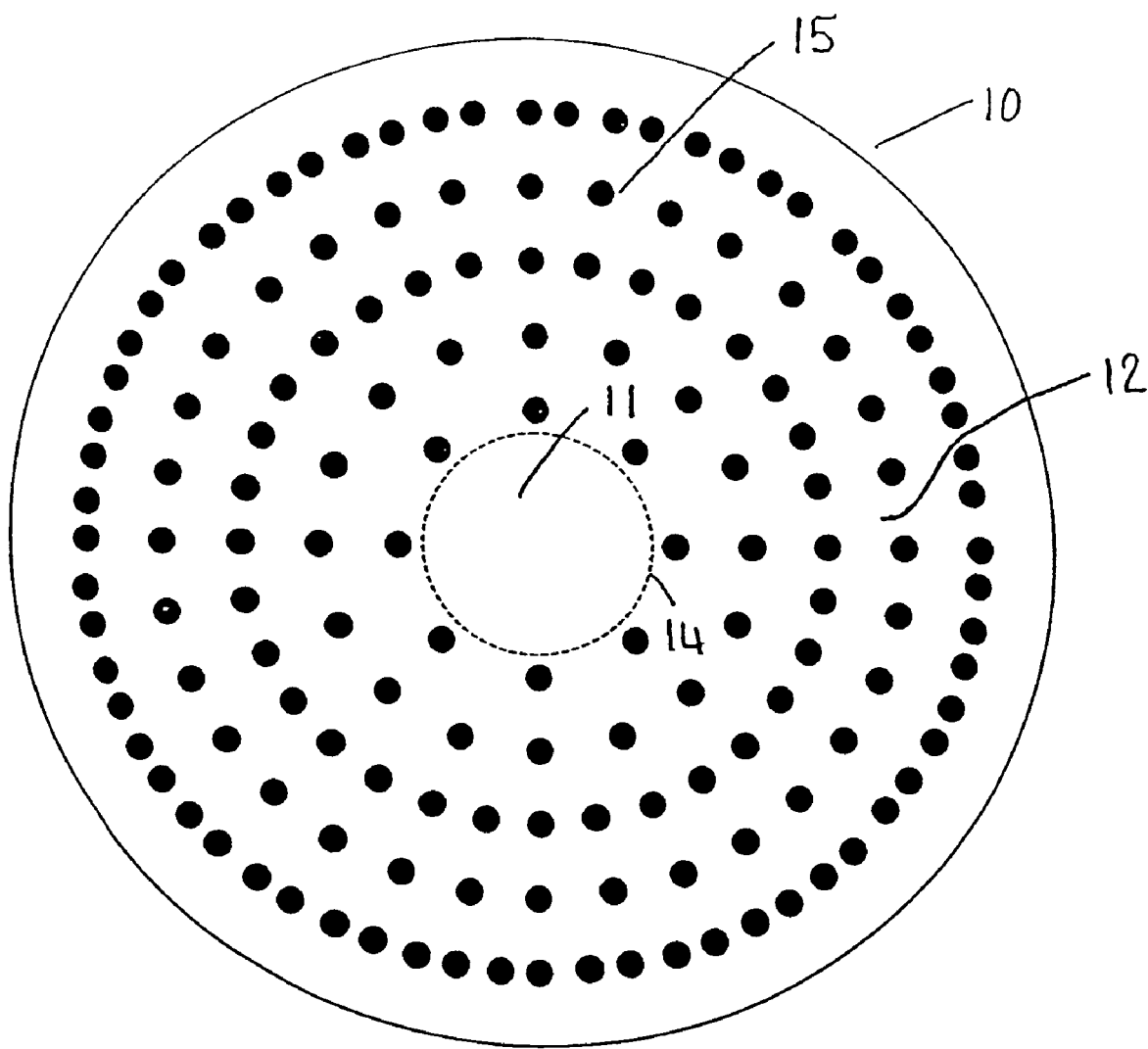
Figure 3:
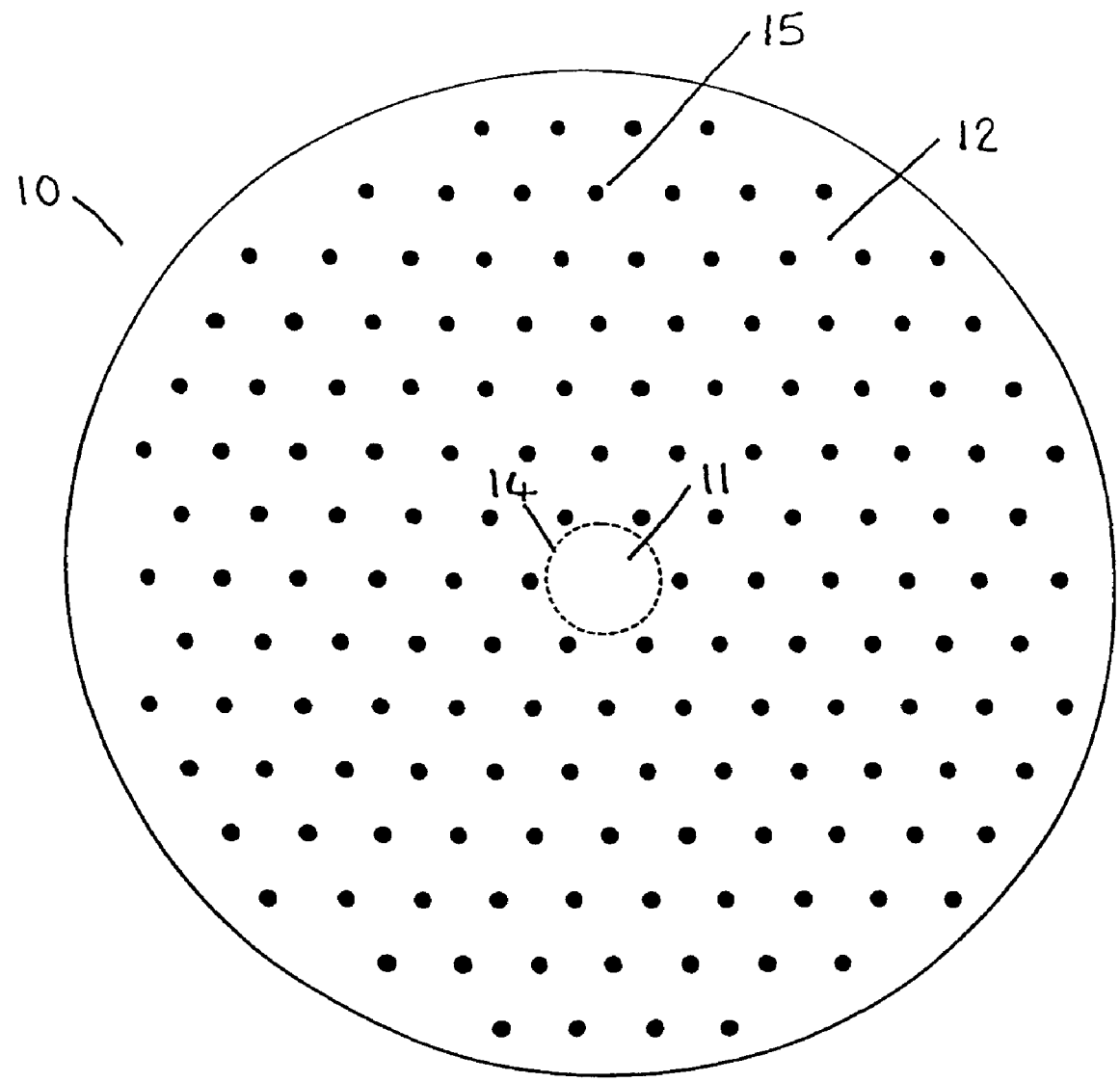

FIGS. 2 and 3 show diagrammatic representations of the cross-section of optical fibres that are similar to that shown in FIG. 1 and like reference numerals are used to identify like features. However, in the optical fibre of FIG. 2, the light guiding elements 15 in the form of channel-like holes are uniformly distributed throughout the whole of the core-surrounding region 11 and are disposed in concentric circular arrays. Similarly, in the optical fibre as shown in FIG. 3, the light guiding elements 15 are uniformly distributed throughout the whole of the core-surrounding region 11 but are disposed in concentric hexagonal arrays.

Figure 4:
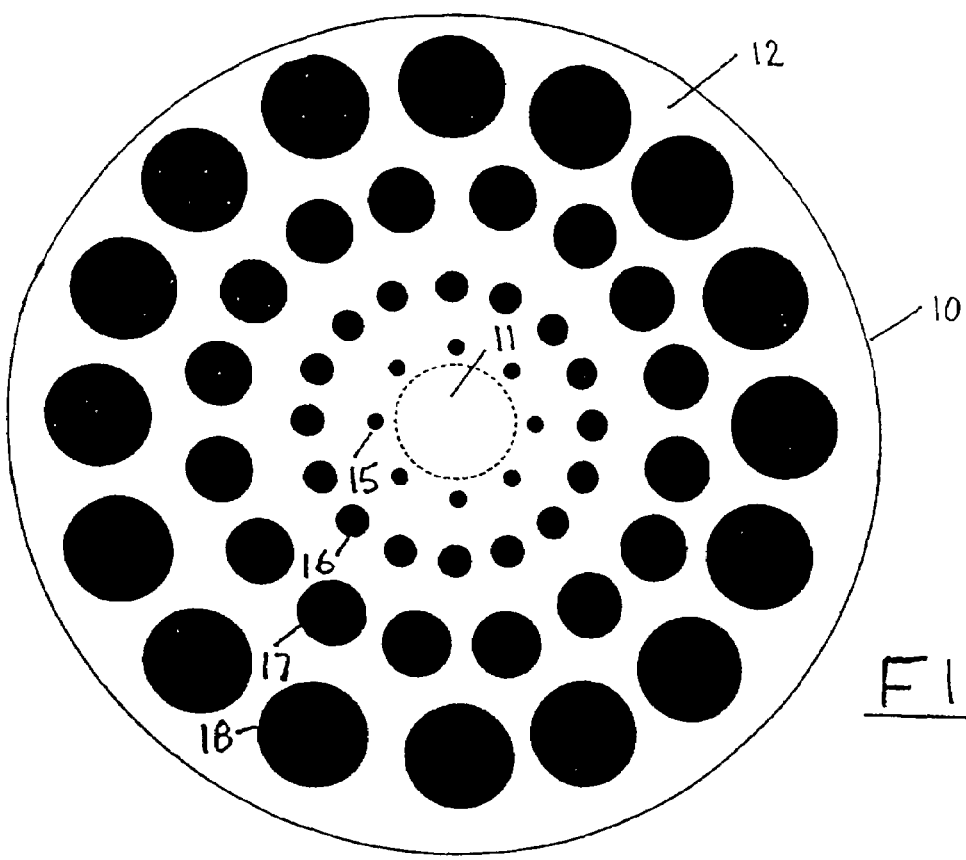

FIG. 4 shows a further alternative of the polymer optical fibre; one in which light confining elements 15, 16, 17 and 18 are distributed about the core region in circularly concentric arrays, with the cross-sectional area of the elements in the respective arrays increasing with radial distance from the axis of the core region 11. The reason for this arrangement is explained as follows.

Large mode area, single mode optical fibre has been found to be more susceptible to bending losses than conventional single mode fibre, and it is predicted that this applies with some effect at least to polymer optical fibres just as in the case of silica fibres. The bending losses arise from both geometric disposition and stress induced by mechanical bending. Mechanical bending of the optical fibre effectively modifies the refractive index of the fibre. Thus, mechanical bending exerts stress on the fibre material, whatever its composition may be, causing the material inside of the neutral axis to be placed in compression and material on the outside of the neutral axis to be loaded in tension. This induces a change in the refractive index profile through the elasto-optic effect. At a certain radius of curvature, the stress-induced refractive index change will reach the same order of magnitude as the refractive index difference between the core and core surrounding regions in the straight fibre. This is the critical bending radius and it signifies the minimum allowed bending radius below which light is no longer properly confined to the core region of the fibre, resulting in large losses.

To achieve single mode propagation, especially in the case of a large mode area, a very small difference in the effective refractive index of the core region and the core-surrounding region is required. This leaves the fibre vulnerable to bending losses.

The present invention in its most preferred form provides for the maintenance of single-mode transmission with the option of using a large mode area, without the fibre being vulnerable to bending losses.

Thus, as indicated in FIG. 4 of the drawings, the first ring of light confining elements 15 is constituted by channel-shaped holes having very small diameters, and the hole size increases in the subsequently larger (concentric) rings 16, 17 and 18 of channel-like holes. This provides the required weak index-difference guiding in the core region 11 of the fibre, ensuring single moded transmission, whilst the outer rings of the larger holes (which provide the larger index difference) protect against leakage when the fibre is bent. Thus, this may be regarded as an air-polymer micro-structure version of a graded-index single mode optical fibre.

In addition to the use of the arrangement shown in FIG. 4 to reduce bending losses, the shape and size of the channel-like air holes that constitute the light confining elements may be utilised to reduce mechanical stresses and, at the same time tailor index grading in the fibre material. The channel-like holes will normally be occupied by a medium (e.g. a vacuum, air or other gas) that has a much greater elasticity than the material that immediately surrounds the holes. Therefore, the mechanical stresses due to bending of the optical fibre will be relieved by the deformation of the holes, this reducing the stress induced refractive index changes in the fibre material and thus, further, the bending losses.

Figure 5:
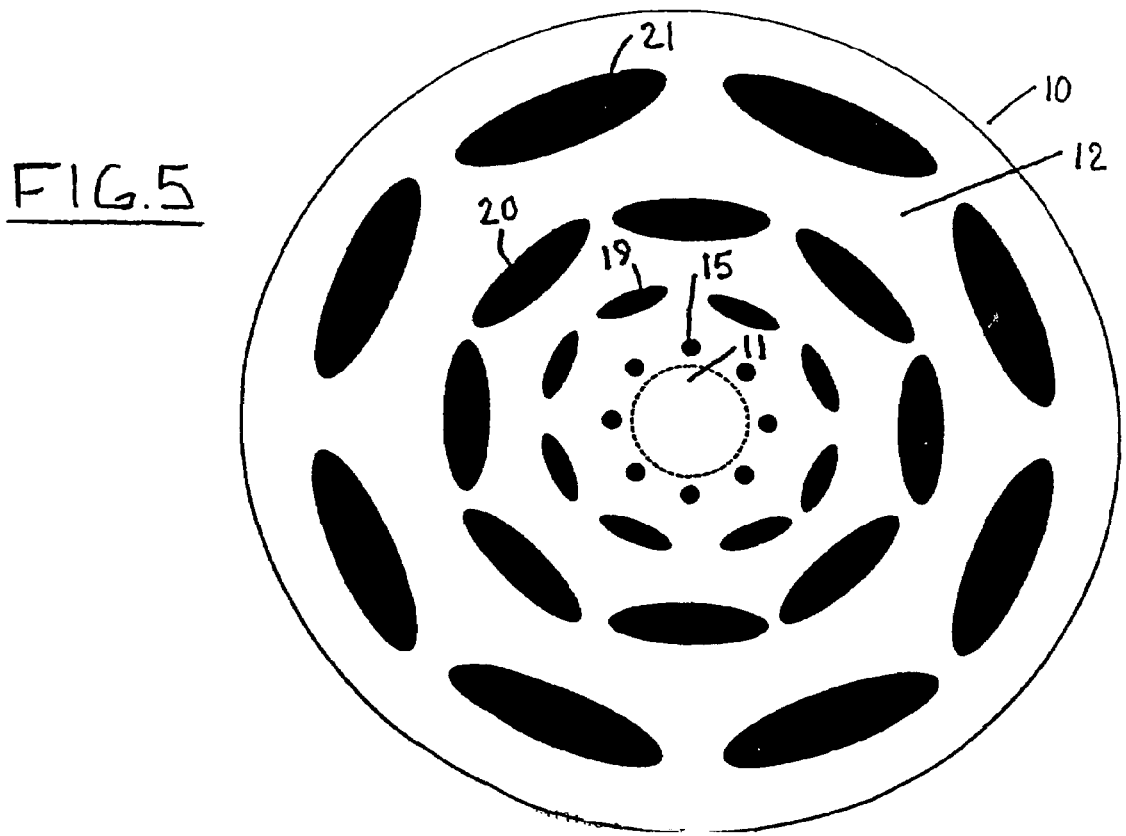
Figure 6:
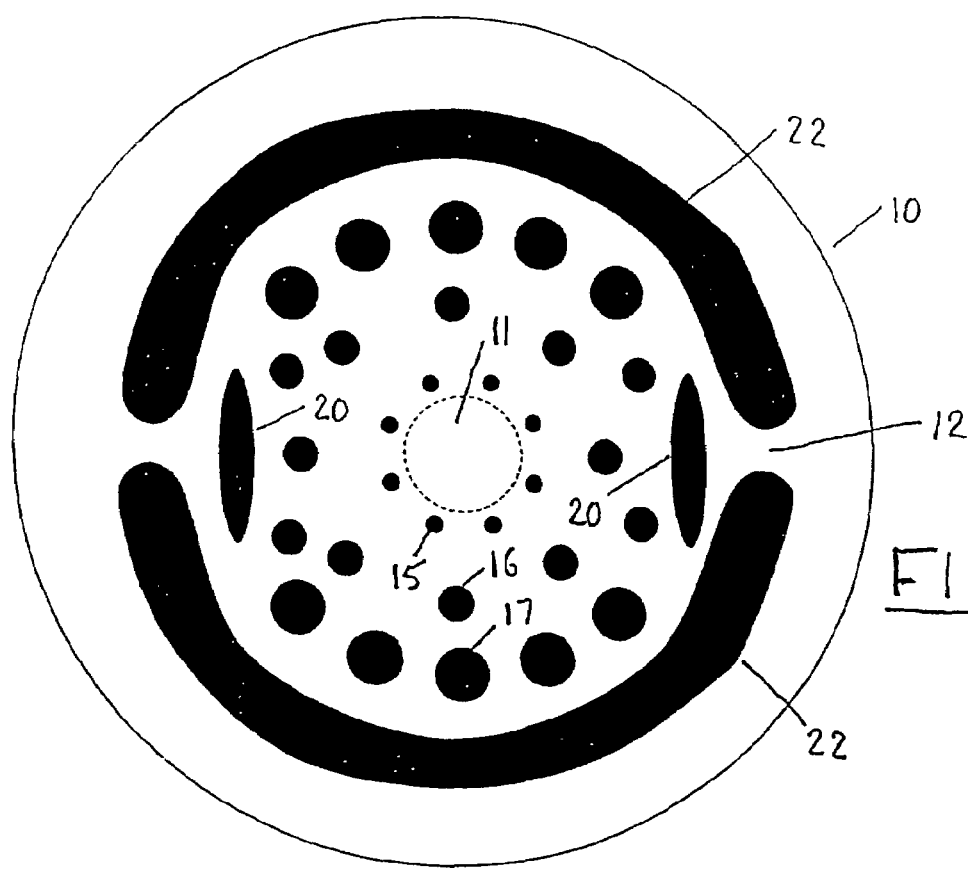

The optical fibres that are shown in cross-section in FIGS. 5 and 6 illustrate variations of that which is shown in FIG. 4 and provide the optical fibres with characteristics to meet differing requirements. In the case of the fibre shown in FIG. 5, an innermost ring of circular-section channel-form holes 15 is provided, but this is surrounded by concentric rings of elliptical-form channel-like holes 19, 20 and 21. However, the structure still exhibits circular symmetry.

In contrast to the arrangement shown in FIG. 5, that which is shown in FIG. 6 exhibits different symmetries about the X—X and Y—Y axes. In this case the core region 11 is surrounded by two concentric rings of light confining elements 15 and 16, with the outer ring 16 being in part surrounded by an incomplete ring of channel-like holes 17. Then, in addition to the provision of two elliptical holes 20, two arcuate-form channel-like holes 22 are provided within the core-surrounding region 12.

Figure 7:
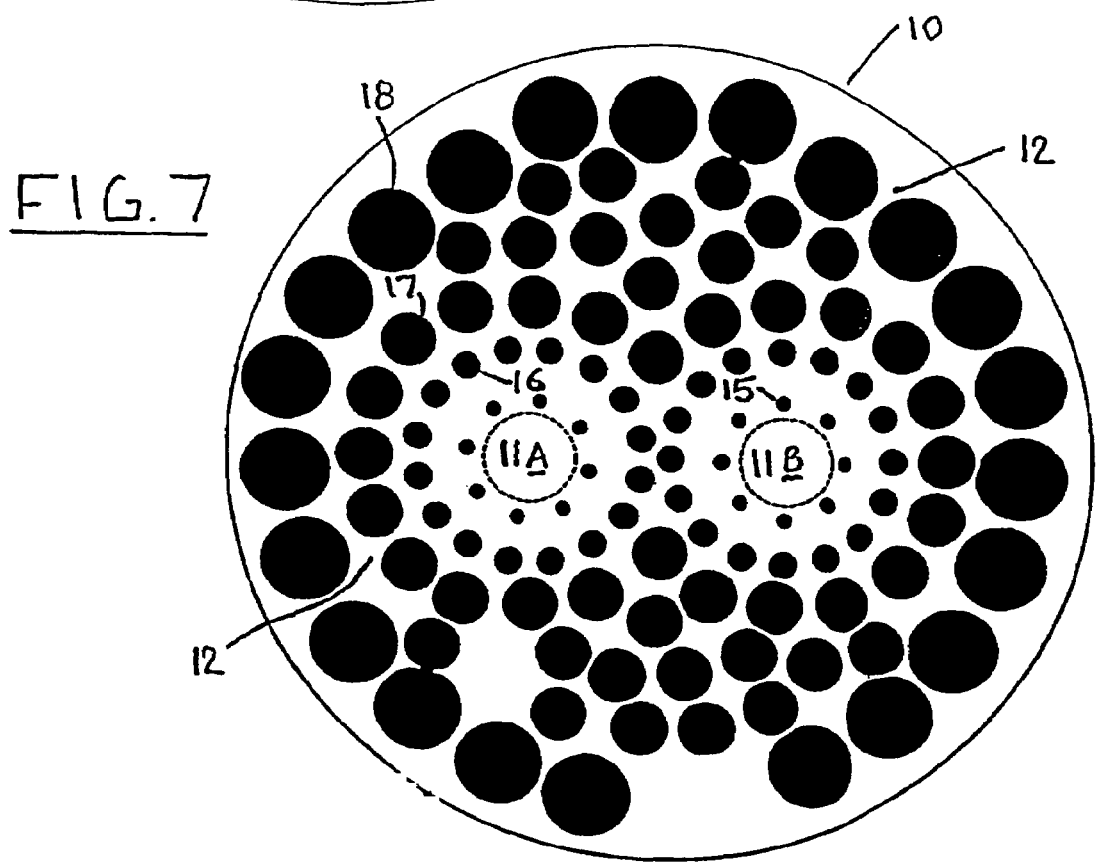

FIG. 7 shows a further optical fibre 10 which embodies the features of the invention and the arrangement illustrated has a superficial similarity with that which is shown in FIG. 4. However, in the case of the optical fibre as shown in FIG. 7, two core regions 11A and 11B are provided, each of which is surrounded by the core-surrounding region 12. Also, each of the core regions 11A and 11B is surrounded by inner rings of light guiding regions 15 and 16, and subsequent light guiding elements in the form of channel-like holes 17 and 18 are located within the common core surrounding region 12 and are shared by both of the core regions 11A and 11B.

The various optical fibres as described and illustrated in the various drawings may be formed in various ways. For example, they may be drawn from preforms that are fabricated from a single polymeric material with holes cored into the material. Alternatively, the optical fibres may be drawn from an extrusion dye that is arranged to effect formation of the required holes as a part of an extrusion process.

Other variations and modifications may be made in respect of the optical fibre in its various forms without departing from the scope of the invention as defined in the appendant claims.

The claims defining the invention are as follows:

1. An optical fibre comprising:
   at least one light guiding core region comprised of a polymeric material;
   a cladding region surrounding the at least one core region, the cladding region comprising a unitary polymeric material body; and
   a plurality of light confining elements formed within the unitary polymeric material body, the light confining elements extending along the at least one core region, wherein at least a majority of the light confining elements exhibit a refractive index lower than that of the unitary polymeric material body.

2. An optical fibre cladding as claimed in claim 1, wherein the unitary polymeric material body is composed of the polymeric material from which the core region is at least in part composed.

3. An optical fibre as claimed in claim 1, wherein the light confining elements are in the form of longitudinally extending channel-like holes.

4. An optical fibre as claimed in claim 3, wherein at least some of the holes are evacuated.

5. An optical fibre as claimed in claim 3, wherein at least some of the holes are occupied by air.

6. An optical fibre as claimed in claim 3, wherein at least some of the holes are filled with a fluid other than air.

7. An optical fibre as claimed in claim 1, wherein some or all of the light confining elements comprise filaments of solid material.

8. An optical fibre as claimed in claim 1, wherein at least some of the light confining elements have a circular cross-section.

9. An optical fibre as claimed in claim 1, wherein at least some of the light confining elements have an elliptical cross-section.

10. An optical fibre as claimed in claim 1, wherein at least some of the light confining elements have an arcuate cross-section.

11. An optical fibre as claimed in claim 1, wherein at least some of the light confining elements have a polygonal cross-section.

12. An optical fibre as claimed in claim 1, wherein at least some of the light confining elements are distributed about the core region in a symmetrical manner.

13. An optical fibre as claimed in claim 12, wherein the light confining elements are distributed concentrically around a longitudinal axis of the core region.

14. An optical fibre as claimed in claim 1, wherein the light confining elements are distributed about the core region in circularly concentric arrays, and the cross-sectional area bounded by each of the elements increases with radial distance from a longitudinal axis of the core region.

15. An optical fibre as claimed in claim 1, wherein the light confining elements are distributed about the core region in polygonally concentric arrays, and the cross-sectional area bounded by each of the elements increases with radial distance from a longitudinal axis of the core region.

16. An optical fibre as claimed in claim 1, wherein the light confining elements are distributed about the core region in a periodic lattice like structure.

17. An optical fibre as claimed in claim 16, wherein the periodic lattice-like structure is structured in a manner so to create a photonic bandgap in the unitary polymeric material body.

18. An optical fibre as claimed in claim 17, wherein the core region exhibits a refractive index lower than that of the unitary polymeric material body.

19. An optical fibre as claimed in claim 18, wherein the core region comprises a hollow core portion.

20. An optical fibre as claimed in claim 1, wherein the light confining elements occupy at least 30% of the volume of the unitary polymeric material body.

21. An optical fibre as claimed in claim 1, wherein the core region is composed wholly of the polymeric material.

22. An optical fibre as claimed in claim 1, wherein the optical fibre comprises an outer protective sleeve or sheath.

23. An optical fibre as claimed in claim 22 wherein the outer protective sleeve or sheath is composed of a material different from the material than that of the unitary polymeric material body.

24. An optical fibre as claimed in claim 1, wherein at least some of the light confining elements are distributed about the core region quasi-randomly with respect to the longitudinal axis of the core region.

25. An optical fibre as claimed in claim 1, wherein at least some of the light confining elements are distributed about the core region in a non-lattice like structure.

26. An optical fibre as claimed in claim 1, wherein at least some of the light confining elements have a non-circular cross section.

27. An optical fibre as claimed in claim 1, wherein at least some of the light confining elements have a circular cross section and some of the light confining elements have a non-circular cross section.

28. A graded index optical fibre comprising
at least one light guiding core region comprised of a polymeric material;
a cladding region surrounding the at least one core region, the cladding region comprising a unitary polymeric material body; and
a plurality of light confining elements formed within the unitary polymeric material body, the light confining elements extending along the at least one core region,
wherein at least a majority of the light confining elements exhibit a refractive index lower than that of the unitary polymeric material body and wherein the light confining elements are sized and distributed such that the overall refractive index of the optical fibre follows a decreasing trend with the increase in radial distance from the longitudinal axis of the core region.

29. An optical fibre comprising:
at least first and second light guiding core regions composed at least in part of a polymeric material;
a cladding region surrounding the at least first and second light guiding core regions, the cladding region being composed of a unitary polymeric material body; and
a plurality of light confining elements formed within the unitary polymeric material body, the light confining elements extending along the first and second light guiding core regions,
wherein at least a majority of the light confining elements exhibit a refractive index lower than that of the unitary polymeric material body.

* * * * *

UNITED STATES PATENT AND TRADEMARK OFFICE
CERTIFICATE OF CORRECTION

| | | |
|---|---|---|
| PATENT NO. | : 7,113,681 B2 | Page 1 of 1 |
| APPLICATION NO. | : 10/362573 | |
| DATED | : September 26, 2006 | |
| INVENTOR(S) | : Simon Fleming et al. | |

It is certified that error appears in the above-identified patent and that said Letters Patent is hereby corrected as shown below:

<u>ON THE TITLE PAGE,</u>

Please correct the following:

Item (22) PCT Filed: Please change "June 20, 2001" to --July 20, 2001--.

Signed and Sealed this
Twenty-second Day of March, 2011

David J. Kappos
*Director of the United States Patent and Trademark Office*